United States Patent [19]

Lader et al.

[11] Patent Number: 5,454,872
[45] Date of Patent: Oct. 3, 1995

[54] SYSTEM FOR CONTROLLING AND UTILIZING FINER POWDER PARTICLES IN A POWDER COATING OPERATION

[75] Inventors: Harry J. Lader, Lakewood; William R. Rehman, Vermillion; Gerald W. Crum, Elyria; Richard C. Morgan, Bay Village, both of Ohio

[73] Assignee: Nordson Corporation, Westlake, Ohio

[21] Appl. No.: 98,636

[22] Filed: Jul. 28, 1993

[51] Int. Cl.$^6$ .................... B05C 11/00; B05C 19/06; B05B 15/00

[52] U.S. Cl. .................... 118/602; 118/603; 118/308; 118/310; 118/311; 118/312; 118/313; 118/326; 454/53

[58] Field of Search .................... 118/308, 309, 118/310, 311, 312, 313, 326, 602, 603, 621, 50.1, DIG. 7; 454/50, 53, 55

[56] References Cited

U.S. PATENT DOCUMENTS

| | | | |
|---|---|---|---|
| Re. 32,841 | 1/1989 | Mulder | 406/134 |
| 1,560,910 | 11/1925 | Hannam | 209/250 |
| 2,211,800 | 8/1940 | Thompson | 209/250 |
| 2,276,805 | 3/1942 | Tolman | 406/172 |
| 2,866,553 | 12/1958 | Schmehl et al. | 209/250 |
| 3,480,330 | 11/1969 | Hirs et al. | 118/312 |
| 3,612,616 | 10/1971 | Stewart | 406/172 |
| 3,662,886 | 5/1972 | Kennedy | 209/250 |
| 3,714,926 | 2/1973 | Ofner | 118/312 |
| 3,791,341 | 2/1974 | Diamond et al. | 118/312 |
| 3,814,002 | 6/1974 | Rombach et al. | 118/312 |
| 3,918,401 | 11/1975 | Blakeslee | 118/312 |
| 4,128,078 | 12/1978 | Stoltz et al. | 118/312 |
| 4,291,640 | 9/1981 | Payne | 118/308 |
| 4,376,136 | 3/1983 | Gemez | 427/33 |
| 4,455,222 | 6/1984 | Less | 55/320 |
| 4,561,380 | 12/1985 | Mulder et al. | 118/312 |
| 4,590,884 | 5/1986 | Kreeger et al. | 118/312 |
| 4,610,217 | 9/1986 | Czeiler et al. | 118/312 |
| 4,619,761 | 10/1986 | Franzen | 209/250 |
| 4,662,309 | 5/1987 | Mulder | 118/312 |
| 4,710,286 | 12/1987 | Mulder | 209/250 |
| 4,743,363 | 5/1988 | Darrow | 209/138 |
| 4,765,803 | 8/1988 | Hirth | 55/2 |
| 4,824,295 | 4/1989 | Sharpless | 118/312 |
| 4,987,001 | 1/1991 | Knobbe et al. | 118/312 |
| 4,998,501 | 3/1991 | Vogel et al. | 118/312 |
| 5,018,909 | 5/1991 | Crum et al. | 406/138 |
| 5,153,028 | 10/1992 | Shutic et al. | 118/312 |
| 5,173,326 | 12/1992 | Krämer | 118/312 |

FOREIGN PATENT DOCUMENTS 639046  11/1990  Australia.
2226824  7/1990  United Kingdom.

OTHER PUBLICATIONS

Golovoy, "Deposition Efficiency in Electrostatic Spraying of Powder Coating," Journal of Paint Technology, vol. 45, No. 580, pp. 42≧48, May 1973.

Micron Powder Systems, "An Introduction to Air Classification".

Alpine, "Air Classification".

Wilson, "Powder 'Fines' CAN Be Controlled," Industrial Finishing, Nov. 1991, pp. 26–27.

Primary Examiner—Steve Alvo
Assistant Examiner—Steven P. Griffin
Attorney, Agent, or Firm—Rankin, Hill, Lewis & Clark

[57] ABSTRACT

An apparatus and method for utilizing and controlling finer particles in a powder coating system returns the finer particles to the spraying apparatus to be sprayed on parts by the system. Finer particles are continuously removed from the system by application onto parts, and the accumulation of fines is thereby prevented. The finer particles may be sprayed through specially adapted spray guns, which also permits the utilization of the special advantages of spraying fine powder materials. By removing fine powder particles from the system before they build up, the present invention improves the powder coating operation in various respects.

20 Claims, 10 Drawing Sheets

SYSTEM FOR CONTROLLING AND UTILIZING FINER POWDER PARTICLES IN A POWDER COATING OPERATION

BACKGROUND OF THE INVENTION

1. Field of the Invention

This invention relates to powder coating systems for spraying air entrained solid particulate powder material from powder spray guns onto workpieces within a powder spray booth. More particularly, this invention relates to an improved system for controlling and utilizing the finer particulate powder material in an electrostatic powder coating operation.

2. Description of the Prior Art

Powder spray systems have been used for many years for spraying air entrained solid particulate powder material from electrostatic powder spray guns onto workpieces within a powder coating booth. These systems conventionally collect oversprayed material and re-use it. The recycling system conventionally includes a fan for pulling the oversprayed powder coating material from the powder coating booth into a collector. The collector is comprised of a bank of cartridge filters which separates substantially all of the powder from the air and returns it to the spray guns, or a cyclone recovery system which removes principally only the medium and large powder particles from the air and returns those particles to the spray guns. In a cyclone system, finer particles which are not separated from the air in the cyclone are trapped in a bank of downstream filter cartridges or filter bags. These fines are normally scrapped.

A typical powder coating used in these systems has particles that range in size from submicron to 200 microns ($\mu$). Systems for spraying and recycling powder coating materials, particularly those which use cartridge filter collectors as opposed to cyclone recovery systems, often times have problems associated with the buildup of excessive amounts of fine particles or "fines." Fines are generally defined as particles with a mean diameter of 10 $\mu$ or less. Fines can also be defined in the relative sense as the smaller diameter particles in any given particulate size distribution for a sample of powder coating material.

There are various theories concerning why fine powder particles tend to build up in these systems. One theory is that, when the particles are sprayed from the gun towards the article to be coated, the heavier particles have greater momentum and, therefore, tend to reach the article or the area around the article more easily. The fine particles, on the other hand, have less momentum, and, therefore, have more difficulty breaking loose from the booth air currents. Another belief is that coarser particles are more easily charged than finer particles due to apparent greater attraction of charging ions to the larger particles. The greater charge on the larger particles causes them to be more strongly attracted to the part being coated. It is also believed that surface repulsion is a factor, that is, that even if the finer particle with its lower momentum, and lower charge, does reach proximity to the part, it is more likely to be repelled away from the part by the larger particles already on the part due to the fact that both the large and small particles are charged to the same polarity. Therefore, whereas a large charged particle is attracted to the electrical grounding surface presented by the article to be coated, the finer particle is more likely to be repelled by an article surface already covered by larger particles charged to the same polarity as the smaller particles.

The result of these factors, and possibly others, is that fine particles do not adhere to the part being coated with the same frequency as large particles and instead become entrained in the booth air flow leading into the collection system. In the case of a cyclone collection system many of these fines will not be separated from the air in the cyclone and will arrive at the final filtering system where they will be scrapped (i.e., wasted) and thereby removed from the system. In the case of a cartridge filter collection system the fines will be separated from the air with the other recovered powder. The fines returned from either the cyclone or cartridge recovery system will then be sprayed through the spray gun again where the same factors discussed above again come into play with the result that the fines most likely will again not adhere to the part and will be collected in the recovery system. The result will be, particularly with cartridge filter recovery systems, that the fine particles in the system will build up over time.

There are many deleterious effects of allowing finer particles to build up in a powder coating system. Too high a concentration of finer particles contributes to low film thickness, poor fluidization in the feed and reclaim hoppers, excessive agglomeration of fine particles (i.e., silting) in pumps, feed lines and guns, reduced efficiency of filters and sieves due to blinding of pores by the finer particles, and increased powder deposition on the guns and booth surfaces. One reason why finer particles are particularly attracted to the booth surfaces is the Van der Waals force which attracts small particles toward larger more massive particles such as the booth walls. Increased powder deposition on the booth walls makes the cleaning of the booth more difficult and time consuming when it is time to change from powder coating with one color of powder to another. Blinding of filters by the finer particles results in the more frequent replacement of filters which is inefficient, time consuming and costly.

To get the fines out of systems having cartridge filter recovery systems, some powder coating users will simply dump all the powder in the system when the fines concentration becomes excessive. In cyclone recovery systems the fines are more or less being continuously dumped, which reduces the fines concentration in the system. In either type of recovery system, however, the fines are often wasted and not effectively utilized.

To avoid having to periodically dump all powder from the system, or continually dump fines in cyclone systems, some powder coating users are now sending the fines back to the powder coating material manufacturer for reprocessing or forcing powder coating material manufactures to remove fines before shipping the powder. These methods, however, substantially increase the cost of the powder coating material to the users.

SUMMARY OF THE INVENTION

The present invention overcomes many of the problems of the prior art resulting from wasting finer powder particles and too high a concentration of finer particles by providing an apparatus and method for utilizing and controlling fines and finer particles in a powder spray system. The present invention separates out finer particles and diverts them to dedicated spraying apparatus from which they can be more effectively applied to parts, so that they are removed from the system. Thus the accumulation of finer particles is prevented by ensuring that they are continuously applied to the parts being coated. By removing finer particles from the system in this way before they build up or before they pass through a cyclone recovery system and are dumped, the present invention improves the overall powder coating system by avoiding the various problems described above.

One of the factors discussed above affecting the ability of finer particles to adhere to the parts being coated is the relatively poor ability of finer particles to become charged. It is believed that spraying finer particles in the presence of medium size and larger (i.e., coarser) powder coating particles reduces the opportunity for the finer particles to become charged due to the apparently greater attraction of the available charging ions to the coarser powder particles. Therefore, according to the present invention, one or more separate electrostatic spray guns are dedicated to the spraying of finer particles only. The result is that the finer particles do not have to "compete" with coarser particles for the available charging ions, and, therefore, the available charging ions become attracted to the finer particles to charge them and cause them to more readily adhere electrostatically to the part being coated. Using this technique, the finer powder particles will not be wasted by cyclone recovery systems and will not become unduly concentrated in systems employing cartridge recovery systems. Moreover, by dedicating spray guns to spraying finer powder particles, advantages of spraying finer particles alone, such as a finer surface finish on certain parts of the product, can be realized.

As is suggested above, the invention discloses ways of, not only more effectively utilizing fine powder particles as defined above, but also ways of more effectively utilizing "finer" powder particles which can be described in relative terms as the smaller particles of any given particle size distribution present in a powder coating operation. Thus, one teaching of the present invention is that more effective powder charging will occur overall if a narrower particle size distribution is sprayed through a gun than if a broader particle size distribution is sprayed through the gun.

Another way of saying this is that the buildup of finer particles is related more to the broadening of the particle size distribution curve than it is to the presence of finer particles per se. That is, it is believed that a powder with a small mean particle size can be charged effectively if the distribution is narrow. Therefore, the present invention provides a solution to the build up of finer particles by classifying some or all the powder sprayed into two or more size ranges having narrower distributions than the virgin powder. The finer powder is sprayed through dedicated spray guns, and optimally spray guns which are especially adapted for charging and spraying finer particles. By spraying finer powder through specially adapted spray guns and by utilizing a narrower particle size distribution than virgin powder within these guns, the finer powder can be more effectively coated onto parts.

It is known that finer powders provide smoother and thinner finishes than coarser particles do. The present invention, therefore, not only provides a solution to the waste or build up of finer particles, but also utilizes the advantages that these finer particles can provide in the coating process. That is, by spraying the finer powder through equipment specially adapted for it onto areas where thinner films and/or better finish are required, a part can be optimally powder coated. According to this novel method, the coarser powder can be used for internal surfaces where surface finish is not as critical, wear areas where thicker coating is desired, or deep recesses where the greater momentum of the heavier powder improves the penetration.

The present invention also provides an integrated separator assembly that combines the elements needed for providing the separation and spraying of finer particles into a single unit that can be easily retrofit on existing systems.

These and other advantages are provided by the present invention of a powder coating system which comprises a spraying device for spraying solid particulate powder on workpieces, a powder recovery portion for recovering oversprayed powder, a classifier connected to the recovery portion for separating finer particles from other particles, and a return portion for returning the finer particles to the spraying portion to be sprayed onto the workpieces.

In accordance with another aspect of the present invention, a method of powder coating is provided which comprises the steps of spraying solid particulate powder onto workpieces using electrostatic spraying means, recovering oversprayed powder, separating finer particles from other particles, and returning the finer particles to the spraying means for spraying onto the workpieces.

DETAILED DESCRIPTION OF THE PREFERRED EMBODIMENT

Figure 1:
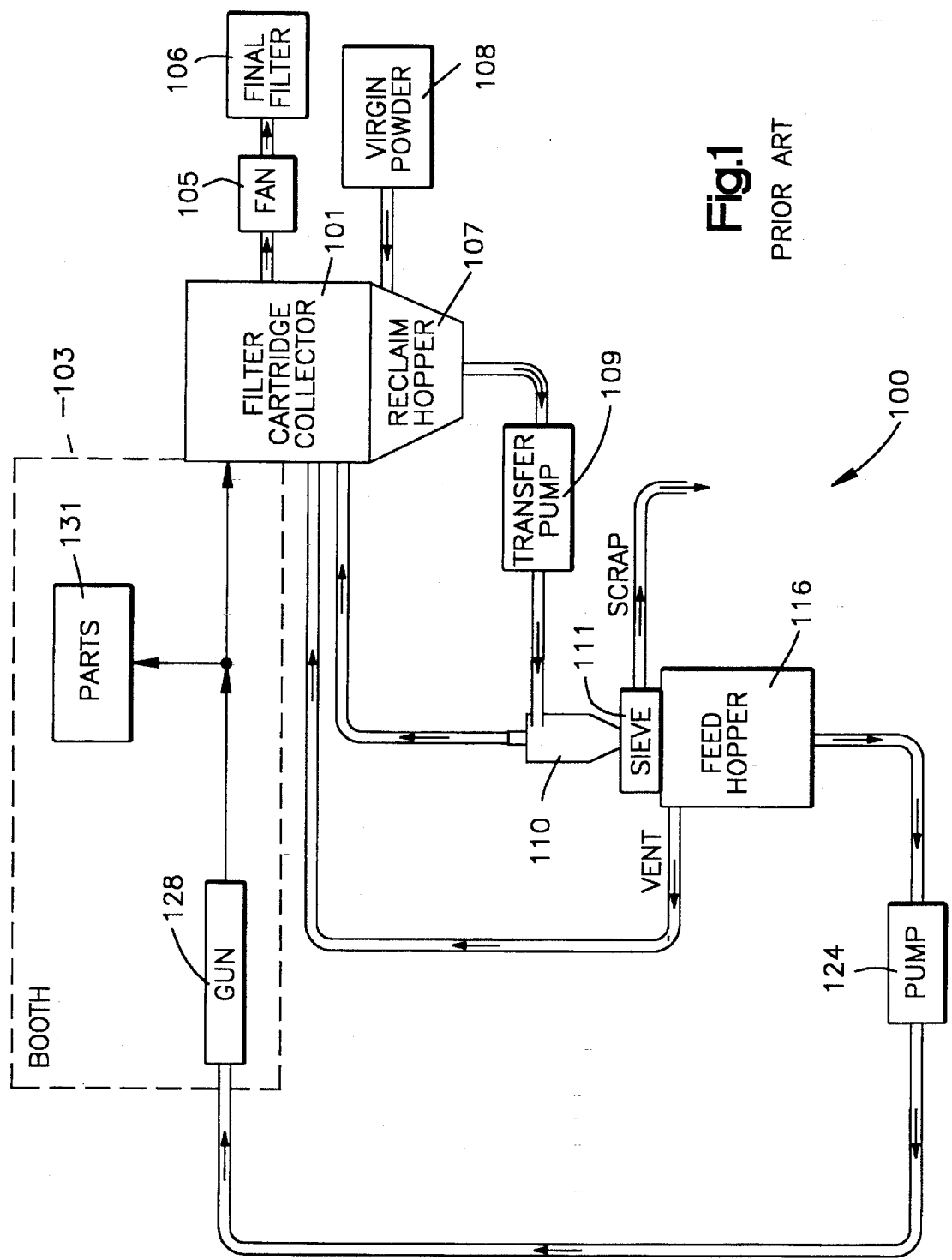
FIG. 1 is a schematic diagram of a prior art powder recovery and supply system that uses a filter cartridge collector.

The prior art and various embodiments of the apparatus of the present invention used to practice the method of the present invention are shown in FIGS. 1–10. FIG. 1 will be described using reference numbers 100–199, the embodiment of FIG. 2 will be described using reference numbers 200–299, the embodiment of FIG. 3 will be described using reference numbers 300–399, and so forth. Unless otherwise noted, the elements designated by reference numbers having the same last two digits are similar or identical. For example, element 340 in the embodiment of FIG. 3 would be similar or the same as element 240 in the embodiment of FIG. 2.

Referring more particularly to the drawings, and initially to FIG. 1, there is shown schematically a conventional powder system 100 of the prior art. A collector 101 is formed as part of the spray booth 103 and provides a portion of the system which recoverers oversprayed powder oversprayed from the spray booth 103. The oversprayed powder is collected in the collector 101 by means of a fan 105 which pulls the over-sprayed powder from the booth 103 into the collector 101. The collector 101 is a cartridge filter collector such as is shown in U.S. Pat. No. 4,590,884 which is incorporated herein by reference in its entirety. The collector 101 houses a bank of cartridge filters which are connected by a clean air plenum to the fan 105. The filtered air drawn by the fan 105 then passes through a final filter 106 before it is delivered back into the plant. The fan 105 creates a constant air flow from the booth 103 into the collector 101. Parts 131 are conveyed through the booth 130 by an electrically grounded conveyer, and powder sprayed from an electrostatic spray gun 128 which does not electrostatically adhere to the grounded parts is drawn as oversprayed powder from the booth 103 into the collector 101. As the air flow passes through the cartridges, the entrained powder accumulates on the exterior of the filter cartridges where it is separated from the air flow. Each of the cartridges is periodically reverse pulse cleaned to knock the accumulated powder off the exterior of the cartridge so that it can fall down into a reclaim hopper 107. Virgin powder 108 is typically introduced into the system by adding it to the reclaim hopper 107 to replace powder used during the coating operation. From the reclaim hopper 107, powder is pumped by a transfer pump 109 to a mini-cyclone 110. The function of the mini-cyclone 110 is to remove the transport air supplied by the pump 109 from the powder flow. The powder flow enters the mini-cyclone 110 tangentially with the heavier powder particles flowing along the interior wall of the cyclone down into the bottom of the mini-cyclone 110. The transport air which carried the powder into the mini-cyclone turns upward at the bottom of the mini-cyclone 110 and flows up along the longitudinal axis of the mini-cyclone 110 and out the top of the mini-cyclone. While the function of the mini-cyclone 110 is solely to remove the transport air and is not to classify the powder by size, unavoidably some of the finer powder particles do not fall out the bottom of the mini-cyclone 110 with the medium size and large particles, but instead remain entrained in the transport air and are exhausted out the top of the mini-cyclone 110 with the transport air. These fine particles are vented into the reclaim hopper 107 with the transport air. The larger particles exit the mini-cyclone 110 and travel through a sieve 111. Large conglomerations of powder, oversized powder particles and other impurities are removed from the system at the sieve 111 and are scrapped. The remaining powder particles pass through the sieve 111 and collect in a fluidized bed feed hopper 116 which is used to supply powder to the spray gun. A representative fluidized feed hopper is shown in U.S. Pat. No. 5,018,909 which is hereby incorporated by reference in its entirety. The fluidizing air from the feed hopper 116 is vented into the collector 101, and this fluidizing air carries with it a quantity of the finer powder particles, since the finer particles naturally tend to concentrate in the upper portion of the hopper. Powder is pumped from the feed hopper 116 by a pump 124 to a spray gun 128 where the powder is sprayed onto the parts 138. The overspray from the gun 128 again returns to the collector 101 as described above.

Using this prior art system 100, recovered powder and virgin powder are sprayed from the gun 128 onto the parts 131. Recovered powder accumulates in the reclaim hopper 107, and virgin powder 108 is periodically introduced into the reclaim hopper 107 to replenish the powder supply in the system.

A problem with this prior art system 100 is that the finer particles tend to accumulate in the system. Finer particles which are separated from the coarser particles in the mini-cyclone 110 are returned to the collector 107 and become trapped in a continuous loop moving from the collector 101 to the reclaim hopper 107 through the transfer pump to the mini-cyclone 110 and from the mini-cyclone 110 back to the collector 101. Moreover, finer powder particles which do come out the bottom of the mini-cyclone 110 and pass into the feed hopper 116 are more likely to be vented back to the collector 101 with fluidizing air from the hopper 116. The result is that many of the finer particles never reach the spray gun where they may be sprayed on the parts and removed from the system. Moreover, even if they do reach the spray gun 128, they are not likely to be effectively coated onto the parts 131 for the reasons previously explained, so they tend to flow right past the parts and back into the collector 101. AS a result, finer particles tend to accumulate since there is no path out of the system.

Another prior art system employs a cyclone in lieu of the cartridge filter collector 101. This prior art system will be discussed below with reference to FIG. 9. Fines do not become concentrated in a cyclone system because, as discussed above, they are typically continuously dumped to waste.

FIGS. 2–8 which will next be described show the use of the invention with a cartridge filter type overspray recovery collector, and the invention is described principally with respect to this type of collector for convenience. The invention is, however, also suitable and provides advantages with a cyclone type overspray recovery system, and one way in which this would be accomplished will be discussed below with reference to FIG. 10.

Figure 2:
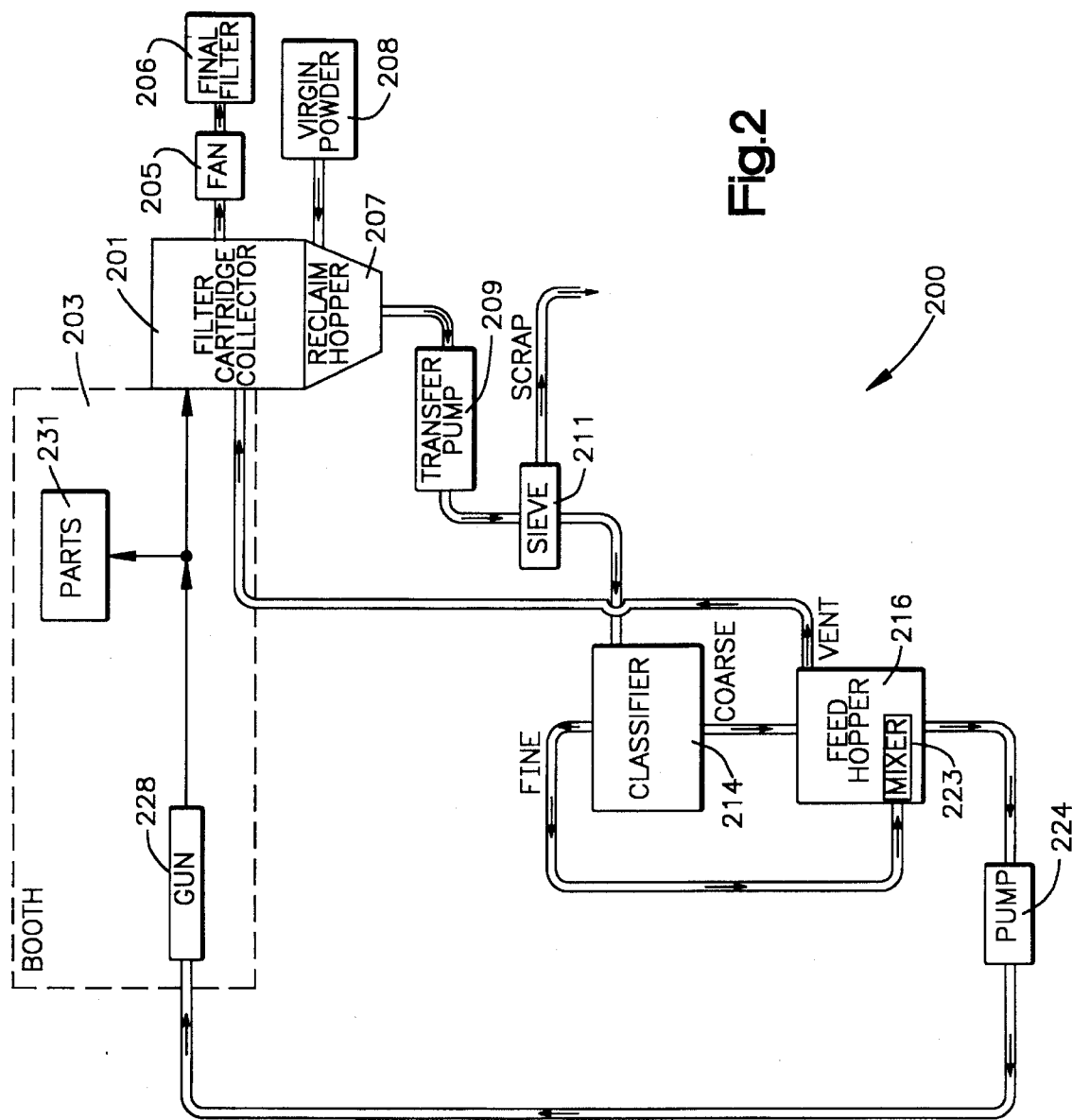
FIG. 2 is a schematic diagram, similar to FIG. 1, showing one embodiment of the present invention in which finer particles are mixed with larger size particles in the feed hopper.

The system 200 of FIG. 2 is somewhat similar to the prior art system of FIG. 1 in that it has a cartridge filter collector 201 formed as part of spray booth 203 and providing the portion of the system for recovering oversprayed powder, the collector 201 having a fan 205 connected to a final filter 206 and having a bank of filter cartridges positioned over a reclaim hopper 207, with a transfer pump 209 on the hopper 207. Virgin powder 208 is introduced into the system by adding it to the reclaim hopper 207 to replace powder used in the powder coating operation. In this system, however, the recovered and virgin powder transported from the hopper 207 by the pump is delivered through a sieve 211 to a classifier 214. The sieve 211 removes large agglomerations of powder, oversized powder particles and other impurities which are scrapped and allows the remaining particles to go to the classifier The classifier 214 divides the incoming powder into relatively fine particles which are diverted out the top of the classifier and relatively coarse particles which are diverted out the bottom of the classifier 214. An example of a particle size classifier which could be used for this purpose is an Alpine Multiplex® MZF Flybed Zig-Zag Classifier manufactured by Micron Powder Systems Company of Summit, N.J. The coarse particles are deposited from the bottom of the classifier 214 by gravity, and the finer particles flow out the top of the classifier 214 with the transport air. This is the general principle of many particle classifiers, to cause the heavier particles to fall out of the transport air flow by gravity, and thereby separate the finer particles from the coarser (i.e., heavier) particles, in that the finer particles tend to remain with the transport air. In the system 200, the coarser particles are deposited from the bottom of the classifier 214 into a feed hopper 216, and the finer particles which exit the top of the classifier 214 are not returned to the collector 201, but instead are sent to return portion in the form of a mixer 223 in the feed hopper 216. The mixer 223 mikes the finer particles in with the coarser particles before pumping them a spraying to a spray gun. 228. In this way, some of the finer particles will become attached to the coarser particles due to the Van der Waals force and will be applied with the coarser particles to parts 231. Note, however, that since the hopper 216 is vented to allow the fluidizing air to escape, some of the finer particles will end up returning to the collector 201 from the hopper 216 with the fluidizing air. However, more of the finer particles will be pumped from the pump 224 to the gun 228 than is the case with the prior art system 100 of FIG. 1. Therefore, the finer particles have a better chance of either adhering to larger powder particles and adhering to one of the parts 231, or becoming sufficiently charged themselves to adhere to one of the parts 231 so that they can be removed from the system.

One problem with the system 200 of FIG. 2, however, is that the finer particles which do not attach to larger particles for the most part will still not adhere to the part 231 being coated for the reasons previously explained and will, therefore, end up in the collector 201.

Figure 3:
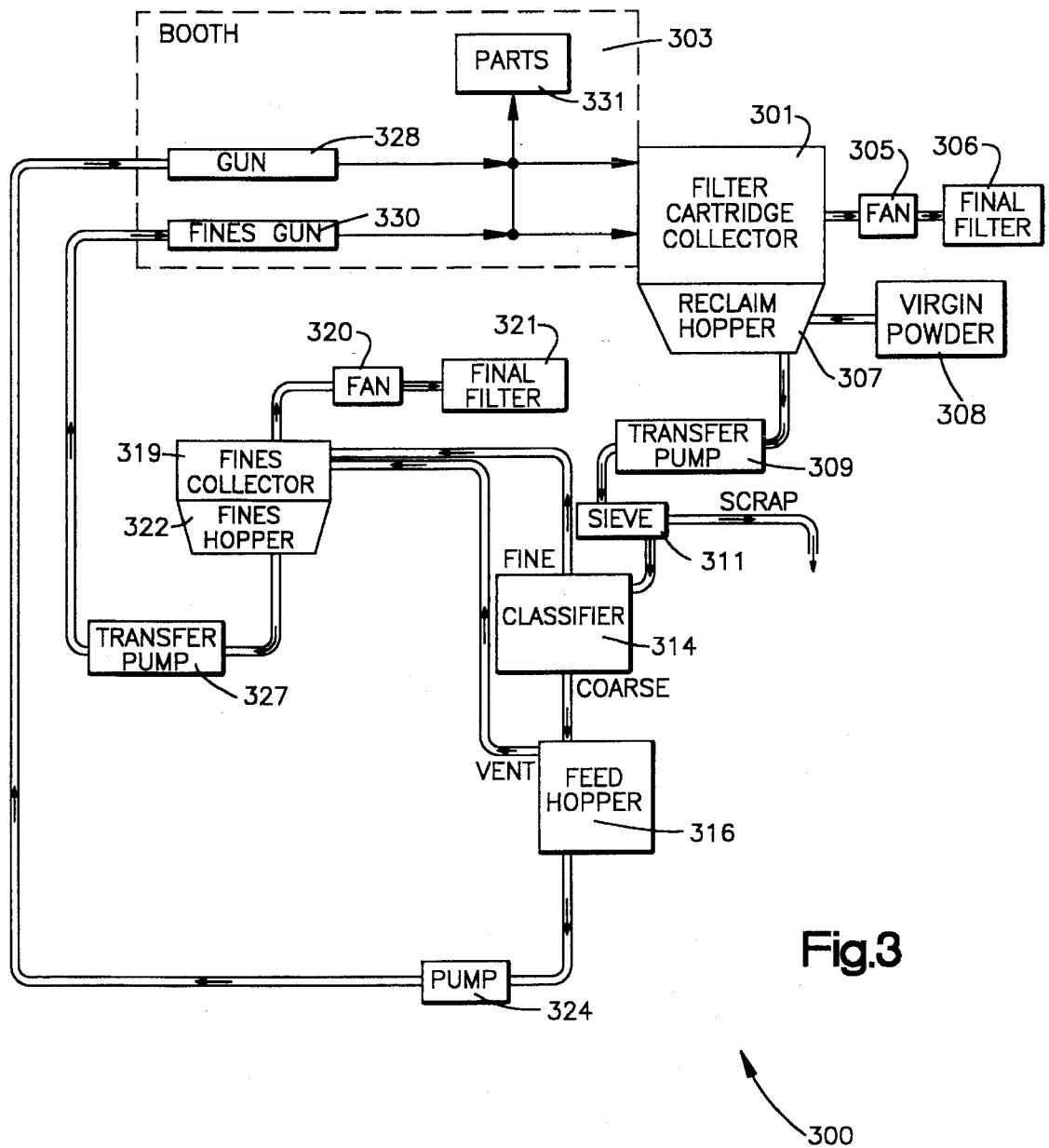
FIG. 3 is a schematic diagram, similar to FIGS. 1 and 2, showing another embodiment of the present invention in which finer particles are sprayed through a separate spray gun.

A system 300 which will utilize the finer particles in the system to a greater degree is shown in FIG. 3 in which the finer particles are fed to a special fines gun and sprayed onto the parts. The system 300 of FIG. 3 is somewhat similar to the prior system 200 already discussed in that it includes a filter cartridge collector 301 formed as part of spray booth 303, a fan 305, a final filter 306, a reclaim hopper 307, a transfer pump 309, a sieve 311, and a classifier 314. Virgin powder 308 is introduced into the system by adding it to the reclaim hopper 307 to replace powder used in the coating process. The larger particles from the classifier 314 drop into a feed hopper 316. The feed hopper 316 is used to supply powder to a spray gun 328 by means of a spray portion comprising a pump 324. The finer particles from the classifier 314 are fed to a special fines collector 319 which can be a cartridge filter collector like the collector 301. A fan 320 draws the finer particles delivered from the classifier 314 with the transport air onto filter cartridges and then passes the filtered air through a final filter 321 for delivering it back into the plant. The filter cartridges in the fines collector 319 are periodically pulsed to knock powder down into a fines hopper 322. A return portion comprising a transfer pump 327 transfers the relatively fine powder from the hopper 322 to a spray gun 330, which in the preferred embodiment, is especially adapted for charging finer powder particles and spraying them onto the parts 331. One example of a preferred gun is disclosed in copending U.S. patent application Ser. No. 07/956,615, assigned to the owner of the present invention, the disclosure of this patent application being hereby incorporated by reference in its entirety. The excess powder or overspray from the fines gun 330 which does not electrostatically adhere to the parts 331 is drawn into the collector 301 along with the overspray from the gun 328. However, once these finer particles are pumped from the reclaim hopper 307 by the pump 309 into the classifier 314, they are returned to the fines collector 319 and sent through the fines gun 330 again so that they have another opportunity to be charged and applied to the parts 330. By processing the finer particles in this way, the finer particles will not continually build up in the system as they do in systems of the type shown in FIG. 1.

In addition, since it is known that finer powders provide smoother and thinner finishes than coarser ones do, the system 300 provides a solution to the build up of finer particles by using the advantages of the finer particles to spray them by means of a specially adapted fines gun 330. Thus the process not only solves the problem of build up of finer particles, it also provides a better finish on the parts being sprayed.

Figure 4:
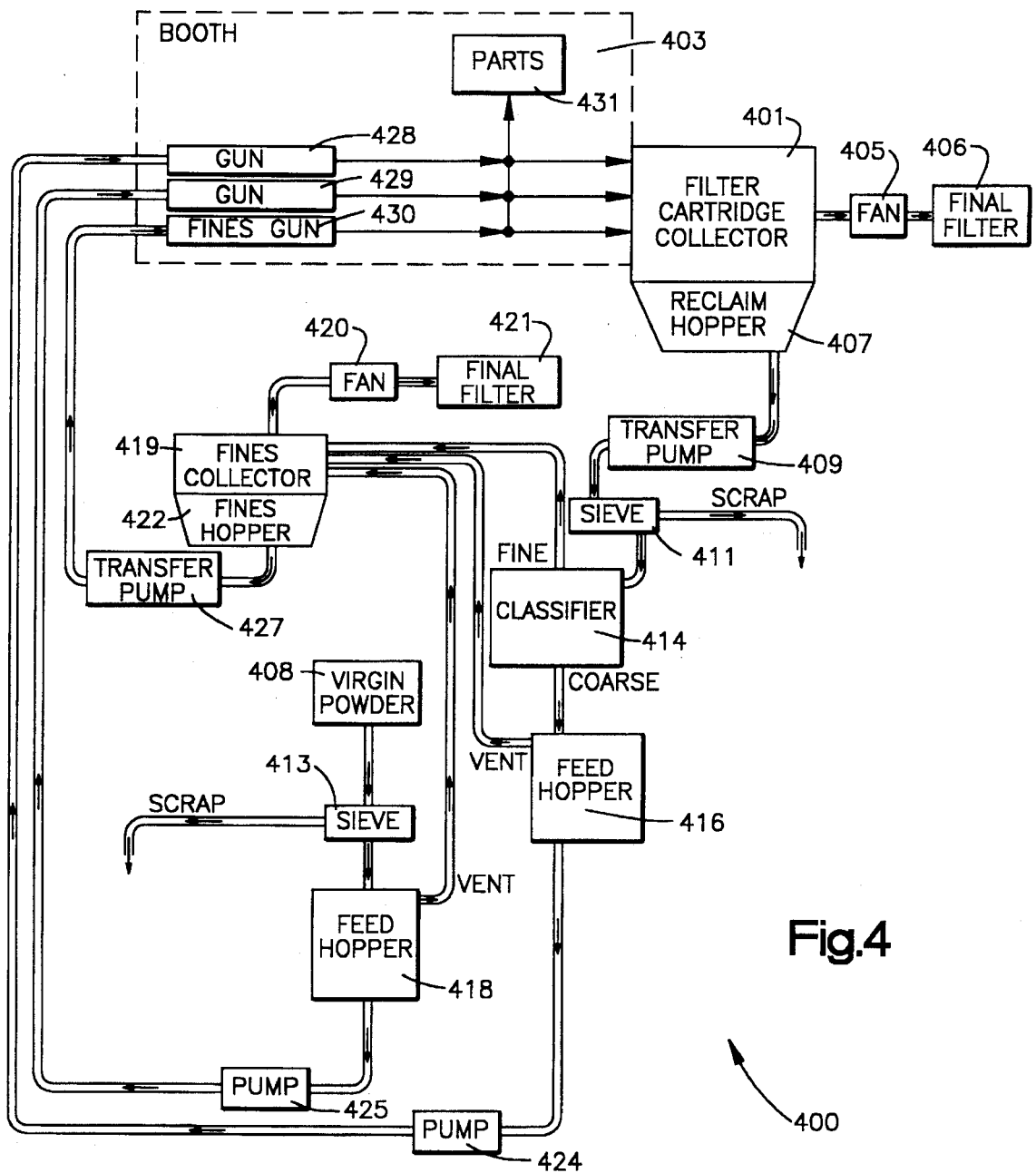
FIG. 4 is a schematic diagram, similar to FIGS. 1–3, showing another embodiment of the present invention in which virgin powder is also sprayed through a separate gun.

The concept of FIG. 3 of using a spraying device with separate spray guns for the finer particles may be taken one step further by providing a dedicated gun for spraying only the virgin powder. This is shown in the system 400 of FIG. 4. The system 400 of FIG. 4 is generally similar to the system 300 just described with reference to FIG. 3 with a collector 401 formed as part of spray booth 403, a fan 405, a final filter 406, a reclaim hopper 407, a transfer pump 409, a sieve 411, a filter cartridge classifier 414, and a feed hopper 416. Powder from the feed hopper 416 is fed by a supply portion using a pump 424 to a spray gun 428 and sprayed onto parts 451. Finer particles from the classifier 414 are sent to a fines collector 419 connected to a fan 420 and a final filter 421 as previously describe. The finer particles from the fines collector 419 are deposited into a fines hopper 422 and pumped by a return portion using a pump 427 to a fines gun 430. Instead of introducing virgin powder into the reclaim hopper 407, however, the virgin powder 408 is introduced into the system through a special feed hopper 428 which is used to hold only virgin material. The virgin material enters the feed hopper 418 through a sieve 413 which is used to separate out large clumps or accumulations of powder that may be present in the virgin supply. The fluidizing air for the virgin powder feed hopper 418 is vented into the fines collector 419 so that any finer particles which are fluidized out of the hopper 418 end up in the fines collector 419. The virgin powder from the feed hopper 418 is then fed using a pump 425 to a separate spray gun 429 for the virgin powder. The oversprayed virgin powder which does not adhere to the parts 431 is drawn into the collector 401 by the fan 405 along with the overspray from the guns 428 and 430 and is reused in the reclaim system already described.

Using the system 400, virgin powder is separately applied through the gun 429 onto the parts 431. Separating the virgin powder from the reclaimed powder is advantageous because the virgin powder will have a higher concentration of larger size particles than the reclaimed powder since the larger sized powder is most easily charged and applied to the parts 431. The reclaimed powder is likely to have a higher concentration of medium to smaller sized particles. Thus, each of the guns 428, 429 and 430 sees a relatively narrower distribution of particles sizes which can., therefore, be more evenly and consistently charged so that a greater portion of the powder particles sprayed from the three guns electrostatically adheres to the part.

Figure 5:
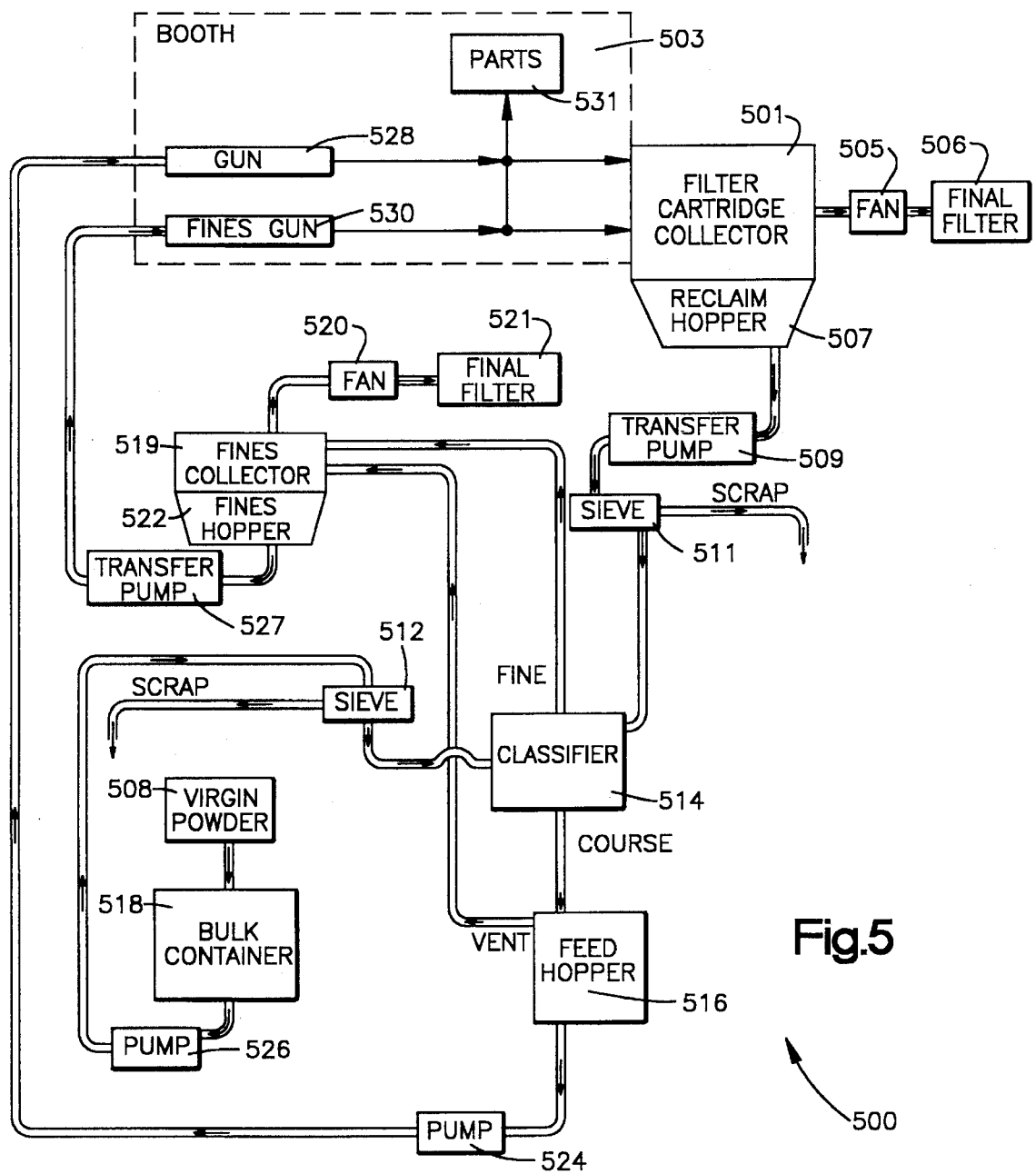
FIG. 5 is a schematic diagram, similar to FIGS. 1–4, showing another embodiment of the present invention in which virgin powder is preclassified to remove finer particles for separate spraying.

It is noted that the virgin powder sprayed from the virgin powder gun 429 in FIG. 4 is actually a mixture of finer and coarser powder particles, and that the finer powder in the virgin powder could be sprayed from the fines gun instead of spraying it from a separate virgin powder gun. The remainder of the virgin powder could then be mixed with the recovered powder. This concept is shown the system 500 of FIG. 5. The system 500 of FIG. 5 is generally similar to the system 400 just described with a collector 505 formed as part of spray booth 503, a fan 505, a final filter 506, a reclaim hopper 507, a transfer pump 509, a sieve 511, a classifier 514, and a feed hopper 516. The system 500 uses a spraying device comprising two guns, a primary gun 528 and a fines gun 530, similar to the guns 328 and 330 of FIG. 3, for spraying powder onto parts 531. Virgin powder 508 is loaded into a bulk container 518, such as the Nordson® Bulk Unloader shown in U.S. Pat. No. Re. 32,841, the disclosure of which is hereby incorporated by reference in its entirety. A pump 526 pumps the virgin powder from the container 518 through a sieve 512 to the classifier 514. The classifier 514 also receives reclaimed powder from the reclaim hopper 507 by means of a transfer pump 509. The classifier 514 diverts the finer particles to a fines collector 519 and the coarser particles to the feed hopper 516 The finer collector 529 is connected to a fan 520 and a final filter 521 as previously described. The finer particles from the virgin powder along with the finer particles from the recovered material pass from the fines collector 519 into a fines hopper 522 from which they are sent to a fines gun 530 by the return portion using a pump 527 for spraying onto parts 531. The larger sized particles from the virgin material, along with the larger sized particles from the recovered material, are deposited by the classifier 514 into the feed hopper 516 from which they are fed to the reclaim gun 528 by the supply portion using the pump 524.

Figure 6:
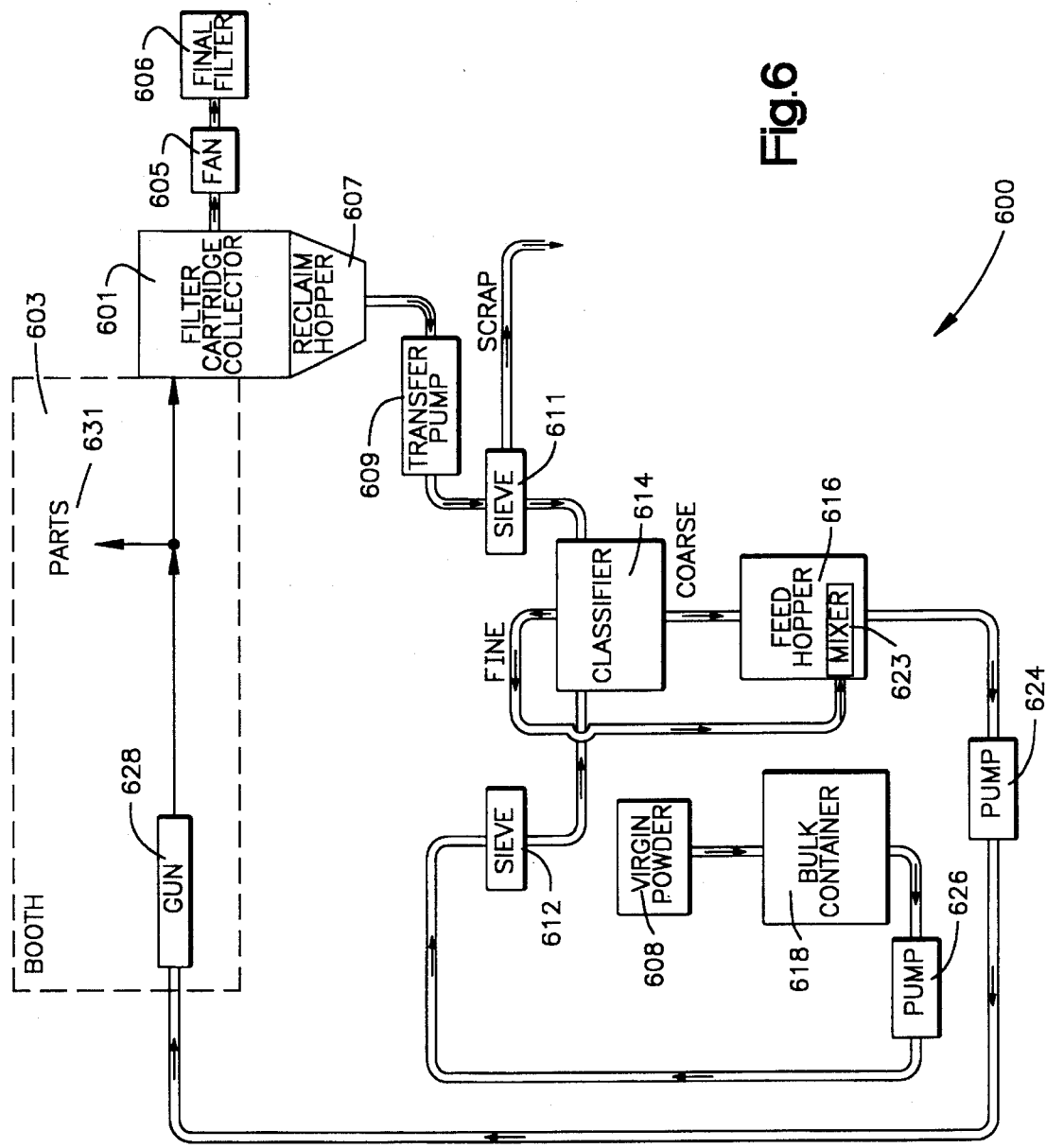
FIG. 6 is a schematic diagram, similar to FIGS. 1–5, showing another embodiment of the present invention in which virgin powder is classified and the finer particles are mixed with larger size particles in the feed hopper.

The concepts of the systems 200 and 500 of FIGS. 2 and 5 are combined in the system 600 of FIG. 6. The system 600 of FIG. 6 is generally similar to the system 500 just described with a filter cartridge collector 601 formed as part of spray booth 603, a fan 605, a final filter 606, a reclaim hopper 607 virgin powder 608, a transfer pump 609, and a sieve 611 a sieve 612, a bulk container 618, a pump 624, a pump 626 and a reclaim gun 628 for spraying powder onto parts 631. The system 600 of FIG. 6 includes a classifier 614, but the finer particles diverted up and out of the classifier 614 are not pumped to a separate fines gun. Instead, the finer particles are fed to a return portion comprising a mixer 623 associated with a feed hopper 616, where the finer particles are mixed with the larger sized particles fed to the feed hopper 616 from the classifier 614. The mixer 623 could be an impingement type mixer which would spray the finer powder into the fluidized bed of larger sized particles in the hopper 616. During the mixing process at least some of the finer particles will become agglomerated with some of the larger particles and will be applied as agglomerated particles to the parts 631.

Figure 7:
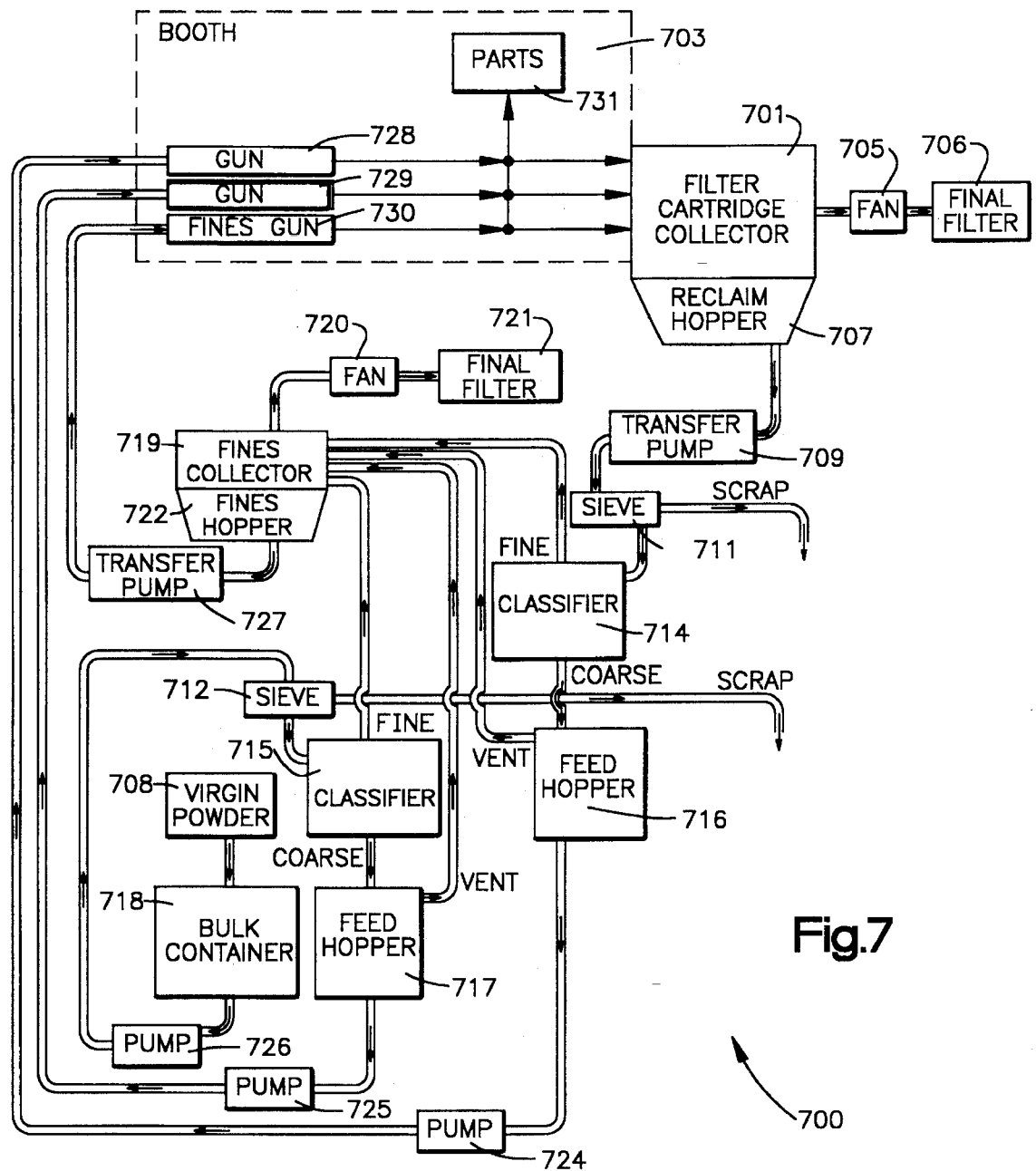
FIG. 7 is a schematic diagram, similar to FIGS. 1–6, showing another embodiment of the present invention in which virgin powder is classified, the finer particles are separately sprayed and the classified virgin powder is separately sprayed.

Another alternative to the system 500 of FIG. 5 is shown in the system 700 of FIG. 7. As with the system 500, the finer particles contained in the virgin powder can be better used in the fines gun rather than spraying these particles along with the rest of the virgin powder in the conventional gun. However, the system 500 uses the remainder of the virgin powder in the same spray gun with the recovered powder. The virgin powder with the finer particles removed may be better used in a separate virgin gun as in the system 400. This is accomplished in the system 700 of FIG. 7 in which the virgin powder is classified by immediately separating the finer particles from the coarser ones before the virgin powder is delivered to the spray gun. The system 700 of FIG. 7 is similar to the system 500 of FIG. 5 with a collector 701 formed as part of spray booth 703, a fan 705, a final filter 706, a reclaim hopper 707, a transfer pump 709, a sieve 711, a classifier 714, a feed hopper 716 a pump 724 and a reclaim gun 728. Finer particles from the classifier 714 are diverted to a fines hopper 722. Virgin powder 708 is supplied to a bulk container 718 where it is fed using a pump 726 through a Sieve 726 into a second classifier 715. The finer particles from the classifier 714 are sent along With the finer particles from the classifier 715 to the fines collector 719 where they are sent by return portion to a fines gun 730 by means of a pump 727 the fines collector 719 is connected to a fan 720 and a final filter 721 as previously described. The larger sized particles from the classifier 715 feed hopper 717 is sent by means of a pump 725 to a dedicated gun 729. The gun 729, therefore, sprays only virgin powder which has been classified to remove the finer powder particles. Thus the gun 729 only charges a relatively narrow particle size distribution of powder which means that a greater portion of the powder sprayed is effectively charged and adheres to the parts 731. This gun 729 can, therefore, operate in a very efficient manner and will produce less overspray than other spray guns.

Figure 8:
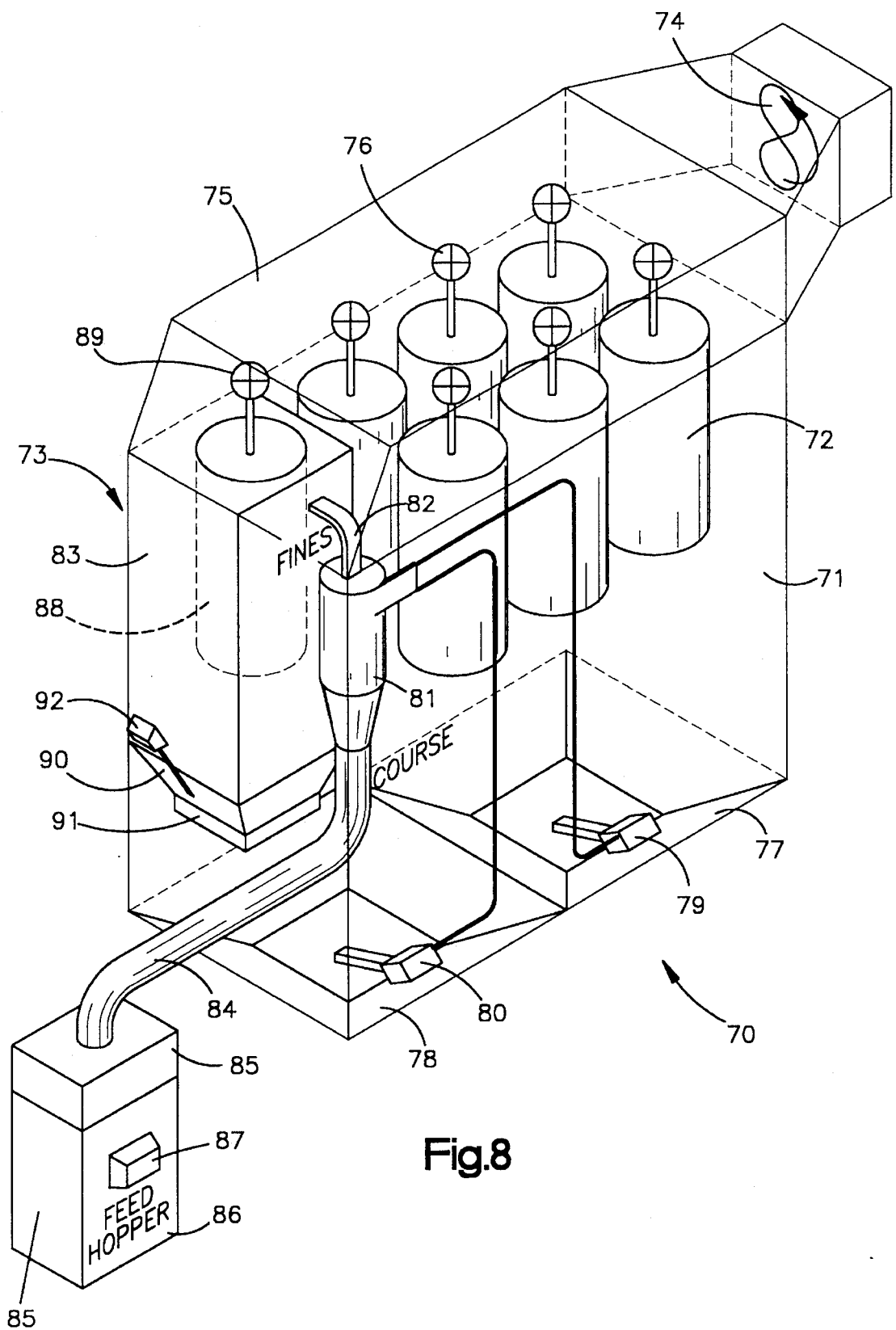
FIG. 8 is a perspective schematic view of an integrated separator for use with the invention.

A variation on the "remote classifier" approach shown in FIGS. 2–7 is the embodiment of FIG. 8 which shows a classifier integrated into the collection hopper. According to this approach, an integrated classifier 70 comprises a housing 71 which supports both a bank of filter cartridges 72 and a classifier/fines hopper assembly 73. The cartridge filters 72 collect oversprayed powder from the powder coating booth in the normal manner. A fan 74 acting through a clean air plenum 75 and the cartridges 72 draw oversprayed powder from the powder coating booth onto the cartridges 72. The cartridges 72 are periodically pulse cleaned by reverse-pulse valves 76 to knock the powder off the exterior of the cartridges 72 and down into collection hoppers 77 and 78. According to this embodiment, however, pumps 79 and 80 located at the bottom of the hoppers 77 and 78 pump the collected powder into a classifier such as a small classifying cyclone 81. The powder enters the cyclone 81 tangentially and swirls around the inside of the cyclone with the heavier particles hitting the interior wall and falling towards the bottom of the cyclone 81 and the lighter particles being exhausted out the top of the cyclone with the transport air through an outlet 82 and into a fines collection chamber 83. The heavier (i.e., coarser) particles which are deposited out the bottom of the cyclone 81 pass through a duct 84 into a sieve which removes clumps and impurities, before passing the coarser powder into a feed hopper 86. The powder is pumped from the hopper 86 to a spray gun dedicated to spraying coarser powder by a pump 87.

The finer powder particles which enter the fines collection chamber 83 are drawn onto a filter cartridge 88 by the fan 74 acting through the clean air plenum 75. The cartridge 88 is periodically reverse-pulsed by a pulse valve 89 to knock the finer particles off the cartridge 88 into a fines collection hopper 90. A fluidizing air plenum 91 is located under the hopper 90 to fluidize the powder in the hopper 90 so that it can be pumped by the a pump 92 to a sieve and feed hopper (not shown) for delivery to a spray gun dedicated to spraying finer particles.

An alternative embodiment of the integrated classifier 70 would be to geometrically configure the hopper 77 so that it is large enough to completely underlie the six filter cartridges 72 and the hopper 78 so that it is small enough to just underlie the lower end of the classifying cyclone 81. With this alternative embodiment, only the pump 79 would be connected to the classifying cyclone 81, and the pump 80 would pump the coarser particles discharged from the cyclone 81 to the sieve 85.

In either embodiment, the integrated classifier 70 provides a single unit that may be retrofit on existing systems to provide the necessary apparatus to classify finer powder particles so that they may be supplied to a fines gun for spraying on parts.

Figure 9:
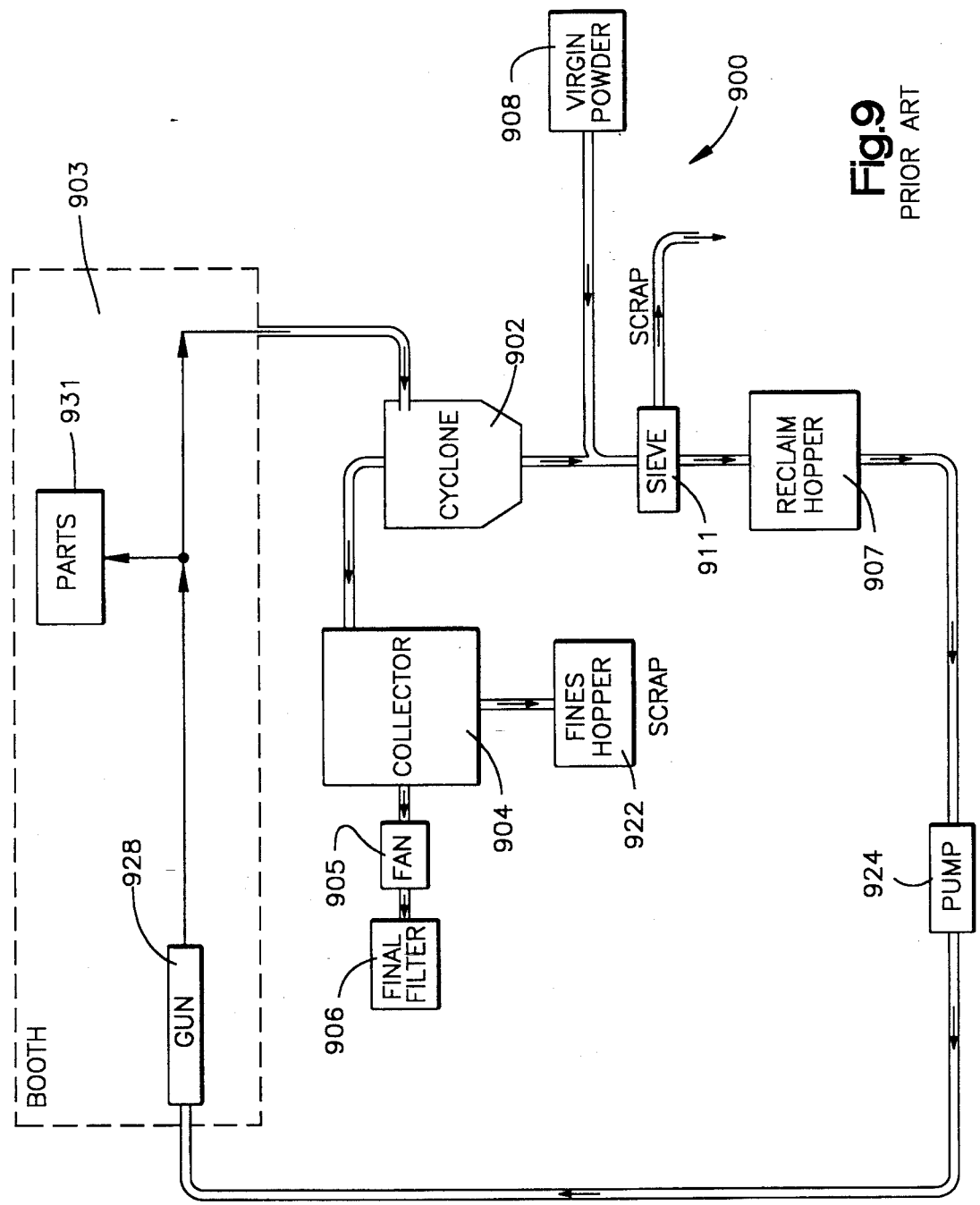
FIG. 9 is a schematic diagram, similar to FIG. 1, showing another prior art powder recovery and supply system that employs a cyclone overspray recovery unit.

While FIGS. 1–8 show the application of the invention to powder coating systems having cartridge filter overspray collectors, the invention is also applicable to cyclone type recovery systems. FIG. 9 shows a conventional prior art powder system 900 that employs a cyclone overspray recovery unit. An inertial separator or cyclone 902 is connected to a spray booth 903. Oversprayed powder conveyed by containment air from the spray booth 903 enters the cyclone 902 tangentially, and the heavier and larger particles flow along the interior wall of the cyclone down into the bottom of the cyclone 902. The finer particles and the transport air which carried the powder into the cyclone 902 turn upward at the bottom of the cyclone and flow up along the longitudinal axis of the cyclone and out the top of the cyclone. The finer particles along with the transport air enter a cartridge filter collector 904 where the air is exhausted from the collector by a fan 905 through a final filter 906. The finer particles are reverse pulsed off the cartridges in the collector 904 and fall from the collector into a scrap hopper 922.

The larger particles exit the bottom of the cyclone 902 and travel through a sieve 911. Large agglomerations of powder, oversized power particles and other impurities are removed from the system at the sieve 911 and are scrapped. The remaining powder particles pass through the sieve 91 and collect in a fluidized reclaim hopper 907. Virgin powder 908 is typically introduced into the system by adding it to the reclaim hopper 907 to replace powder used during the coating operation. Powder is by the pump 924 pumped from the reclaim hopper 907 to a spray gun 928 where the powder is sprayed onto the parts 931. The overspray from the gun 928 again returns to the cyclone 902 as described above. It can be seen that most of the finer particles are separated from the system by the cyclone 902 where they are collected in the hopper 922 and are scrapped or returned to the powder material manufacturer.

Figure 10:
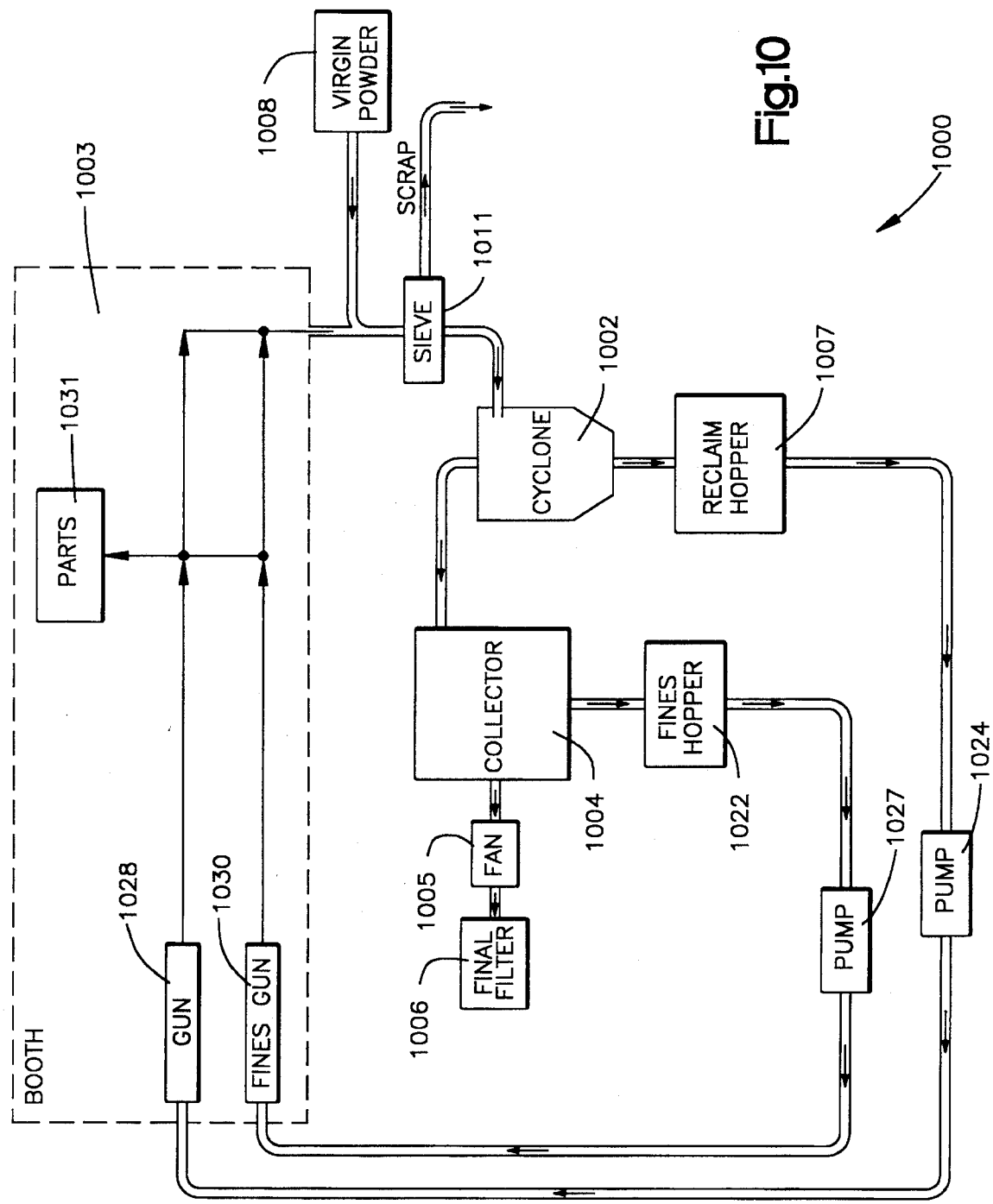
FIG. 10 is a schematic diagram, similar to FIGS. 1–7, showing another embodiment in which the teachings of the invention are applied to a powder coating system employing a cyclone powder overspray recovery unit.

FIG. 10 shows one embodiment in which the teachings of the present invention are applied to the prior art system of FIG. 9. A system 1000 is shown in FIG. 10 has a cyclone or other classifier 1002 which is connected to the spray booth 1003 and into which oversprayed power from the spray booth is transported through a sieve 1011. The sieve 1011 separates the large conglomerations of powder, oversized powder particles and other impurities, so that these particles can be removed and scrapped before they reach the cyclone 1002. Virgin powder 1008 is introduced into the system by adding it through the sieve into the cyclone 1002 to replace powder used in the coating process. The larger particles are deposited from the bottom of the cyclone 1002 into a fluidized reclaim hopper 1007 from which they are pumped by a supply portion using a pump 1024 to a spray gun 1028. The finer particles along with the transport air are exhausted from the top of the cyclone 1002 into a cartridge collector 1004 where the transport air is removed by a fan 1005 through a final filter 1006. The finer particles in the collector 1004 are reverse pulsed from the cartridges in the collector 1004 and are deposited into a fines hopper 1022 from which they are pumped by a return portion using a pump 1027 to a fines gun 1030, which is especially adapted for charging finer powder particles and spraying them onto the parts 1031. Thus, by segregating the finer particles and directing them to the dedicated fines gun 1030, the finer powder particles are not wasted by the cyclone recovery system 1000.

The invention has been shown and described with respect to particular embodiments. This is for the purpose of illustration rather than limitation. Other variations and modifications of the specific embodiments herein shown and described will be apparent to those skilled in the art, and these are also intended to be embraced within the teachings of the invention.

What is claimed is:

1. A powder coating system, which comprises:

a powder spraying device for spraying solid particulate powder onto workpieces;

a powder recovery portion for recovering powder oversprayed by the spraying device;

a sieve connected to the recovery portion for separating and removing oversized particles from the recovered powder;

a classifier connected to the sieve for separating finer particles from other particles in the recovered powder from the sieve; and a return portion for returning the finer particles from the classifier to the spraying device to be sprayed onto the workpieces and for returning said other particles from which the finer particles have been removed by the classifier to the spraying device to be sprayed onto the workpieces.

2. A powder coating system as defined in claim 1, wherein the powder recovery portion includes a filter cartridge collector.

3. A powder coating system as defined in claim 1, wherein the powder recovery portion comprises a cyclone.

4. A powder coating system as defined in claim 3, wherein the cyclone also comprises the classifier.

5. A powder coating system as defined in claim 4, wherein the spraying device includes a dedicated fines spray gun which sprays the finer particles received from the classifier.

6. A powder coating system as defined in claim 1, wherein the spraying device includes a dedicated fines spray gun which sprays the finer particles received from the classifier.

7. A powder coating system comprising:

a powder spraying device for spraying solid particulate powder onto workpieces, a powder recovery portion for recovering powder oversprayed by the spraying device;

a classifier connected to the recovery portion for separating finer particles from other particles in the recovered powder; and a return portion for returning the finer particles to the spraying device to be sprayed onto the workpieces;

wherein the spraying device includes a primary spray gun which sprays powder from the classifier from which the finer particles have been removed and a dedicated fines spray gun which sprays the finer particles received from the classifier.

8. A powder coating system as defined in claim 7, wherein the spraying device includes a dedicated spray gun which sprays virgin powder.

9. A powder coating system as defined in claim 8, comprising in addition a first feed hopper connected to receive recovered powder from the classifier from which the finer particles have been removed, the first feed hopper supplying powder to the primary spray gun, a second feed hopper connected to receive finer particles from the classifier, the finer particles being supplied from the second feed hopper to the dedicated fines spray gun by the return portion, and a third feed hopper for receiving virgin powder and for supplying the virgin powder to the dedicated spray gun that sprays virgin powder.

10. A powder coating system as defined in claim 8, comprising in addition a first feed hopper connected to receive recovered powder from the classifier from which the finer particles have been removed, the first feed hopper supplying powder to the primary spray gun, a bulk container for receiving virgin powder, a second classifier connected to receive virgin powder from the bulk container for separating finer particles from the virgin powder, a second feed hopper connected to receive from the second classifier virgin powder from which the finer particles have been removed, the second feed hopper supplying powder to the dedicated spray gun that sprays virgin powder, and a fines feed hopper connected to receive finer particles from the classifier and from the second classifier, the finer particles being supplied from the fines feed hopper to the dedicated fines spray gun by the return portion.

11. A powder coating system as defined in claim 7, comprising in addition a first feed hopper connected to receive recovered powder from the classifier from which the finer particles have been removed, the first feed hopper supplying powder to the primary spray gun, a second feed hopper for receiving virgin powder, the virgin powder from the second feed hopper being supplied to the classifier for separating finer particles from the virgin powder, and a fines feed hopper connected to receive finer particles from the classifier, the finer particles being supplied from the fines feed hopper to the dedicated fines spray gun by the return portion.

12. A powder spray coating system, which comprises:

a spraying device for spraying solid particulate powder onto workpieces, the spraying device including a powder spray gun:

a collector for recovering powder oversprayed by the spraying device;

a reclaim hopper connected to the collector for receiving recovered powder therefrom;

a transfer pump for pumping recovered powder from the reclaim hopper;

a classifier connected to the transfer pump to receive recovered powder from the reclaim hopper, the classifier separating finer particles from other particles in the recovered powder, the recovered powder from which the finer particles are removed being classified recovered powder;

a first feed hopper connected to receive the classified recovered powder from the classifier;

a supply portion for supplying the spraying device with the classified recovered powder from the first feed hopper; and a return portion for returning the finer particles separated by the classifier to the spraying device to be sprayed onto the workpieces.

13. A powder spray coating system comprising:

a spraying device for spraying solid particulate powder onto workpieces, the spraying device including a powder spray gun;

a collector for recovering powder oversprayed by the spraying device;

a reclaim hopper connected to the collector for receiving recovered powder therefrom;

a transfer pump for pumping recovered powder from the reclaim hopper;

a classifier connected to the transfer pump to receive recovered powder from the reclaim hopper, the classifier separating finer particles from other particles in the recovered powder, the recovered powder from which the finer particles are removed being classified recovered powder;

a first feed hopper connected to receive the classified recovered powder from the classifier;

a supply portion for supplying the spraying device with the classified recovered powder from the first feed hopper; and a return portion for returning the finer particles separated by the classifier to the spraying device to be sprayed onto the workpieces, the return portion including a fines feed hopper connected to receive the finer particles from the classifier;

wherein the spraying device includes a primary spray gun which sprays classified recovered powder from the supply portion and a dedicated fines spray gun which sprays finer particles received from the classifier by the return portion.

14. A powder spray coating system as defined in claim 13, including a second feed hopper for receiving virgin powder, wherein the spraying device includes a dedicated spray gun which sprays virgin powder from the second feed hopper.

15. A powder spray coating system as defined in claim 13, including a bulk container for receiving virgin powder, a second classifier connected to receive virgin powder from the bulk container, the second classifier separating finer particles from the virgin powder, the virgin powder from which the fines are removed being classified virgin powder, a second feed hopper connected to receive the classified virgin powder from the second classifier, and a second supply portion for supplying the spraying device with the classified virgin powder, the spraying device including a dedicated spray gun which sprays classified virgin powder from the second feed hopper.

16. A powder spray coating system as defined in claim 13, wherein the collector, the reclaim hopper, the transfer pump, the classifier and the fines feed hopper are combined in a single unit.

17. A powder spray coating system, comprising:

a spraying device for spraying solid particulate powder onto workpieces, the spraying device including a powder spray gun;

a collector for recovering powder oversprayed by the spraying device:

a reclaim hopper connected to the collector for receiving recovered powder therefrom;

a transfer pump for pumping recovered powder from the reclaim hopper;

a classifier connected to the transfer pump to receive recovered powder from the reclaim hopper, the classifier separating finer particles from other particles in the recovered powder, the recovered powder from which the finer particles are removed being classified recovered powder;

a first feed hopper connected to receive the classified recovered powder from the classifier;

a second feed hopper for receiving virgin powder, the second feed hopper being connected to the classifier to separate fines from the virgin powder;

a supply portion for supplying the spraying device with the classified recovered powder from the first feed hopper; and a return portion for returning the finer particles separated by the classifier to the spraying device to be sprayed onto the workpieces.

18. A powder spray coating system as defined in claim 17, wherein the return portion includes a mixer connected to the classifier, the mixer receiving the finer particles from the classifier and mixing the finer particles with the classified recovered powder in the first feed hopper, so that the finer particles can be returned to the spraying device together with the classified recovered powder by the supply portion.

19. A powder spray coating system, comprising:

a spraying device for spraying solid particulate powder onto workpieces, the spraying device including a powder spray gun;

a collector for recovering powder oversprayed by the spraying device;

a reclaim hopper connected to the collector for receiving recovered powder therefrom;

a transfer pump for pumping recovered powder from the reclaim hopper;

a classifier connected to the transfer pump to receive recovered powder from the reclaim hopper, the classifier separating finer particles from other particles in the recovered powder, the recovered powder from which the finer particles are removed being classified recovered powder;

a first feed hopper connected to receive the classified recovered powder from the classifier;

a supply portion for supplying the spraying device with the classified recovered powder from the first feed hopper;

a return portion for returning the finer particles separated by the classifier to the spraying device to be sprayed onto the workpieces, the return portion including a mixer connected to the classifier, the mixer receiving the finer particles from the classifier and mixing the finer particles with the classified recovered powder in the first feed hopper, so that the finer particles can be returned to the spraying device together with the classified recovered powder by the supply portion.

20. A powder spray coating system, which comprises:

means for spraying solid particulate powder onto workpieces, the spraying means including a primary powder spray gun and a dedicated fines spray gun;

a classifier for receiving oversprayed powder from the spraying means and for separating finer particles from other particles in the oversprayed powder, the oversprayed powder from which the fines are removed being classified recovered powder;

means for connecting the classifier to the spraying means to deliver the oversprayed powder from the spraying means to the classifier;

a collector connected to the classifier for receiving finer particles separated by the classifier;

a reclaim hopper connected to the classifier for receiving classified recovered powder therefrom;

means for supplying the primary spray gun with classified recovered powder from the reclaim hopper; and means for supplying the finer particles separated by the classifier from the collector to the dedicated fines spray gun to be sprayed onto the workpieces.

\* \* \* \* \*

UNITED STATES PATENT AND TRADEMARK OFFICE
CERTIFICATE OF CORRECTION

PATENT NO. : 5,454,872

DATED : October 3, 1995

INVENTOR(S) : Harry J. Lader et al

It is certified that error appears in the above-indentified patent and that said Letters Patent is hereby corrected as shown below:

Col. 5, line 12 after which "recoverers" should be --recovers--
Col. 5, line 24 after booth "130" should be --103--
Col. 6, line 2 after parts "138" should be --131--
Col. 6, line 14 after collector "107" should be --101--
Col. 6, line 16 after "pump" insert --109--
Col. 6, line 28 delete "AS" and insert --As--
Col. 6, line 56 after "pump" insert --209--
Col. 6, line 60 after "classifier" insert --214.--
Col. 7, line 11 after "to" insert --a--
Col. 7, line 13 delete "mikes" and insert --mixes--
Col. 7, line 14 after "them" insert --to--
Col. 7, line 14 delete "to" and insert --device in the form of--
Col. 7, line 14 after "gun" delete --.--
Col. 7, line 46 after means of a delete "spray" and insert --supply--
Col. 8, line 4 after parts delete "330" and insert --331--
Col. 8, line 27 after parts delete "451" and insert --431--
Col. 8, line 29 delete "describe" and insert --described--
Col. 8, line 34 delete "428" and insert --418--
Col. 8, line 58 after can delete "." and insert --,--
Col. 9, line 3 after collector delete "505" and insert --501--
Col. 9, line 18 after "516" insert --.--
Col. 9, line 18 delete "finer" and insert --fines--
Col. 9, line 19 delete "529" and insert --519--
Col. 9, line 35 after "607" insert --,--
Col. 9, line 35 after "609," delete --and--
Col.9, line 67 after "716" insert --,--
Col. 10, line 4 delete "Sieve" and insert --sieve--
Col. 10, line 4 before into delete "726" and insert --712--
Col. 10, line 5 delete "With" and insert --with--
Col. 10, line 8 after "727" insert --.--
Col. 10, line 8 delete "the" and insert --The--
Col. 10, line 10 after "715" insert --are sent to a feed hopper 717. The classified powder from the--

UNITED STATES PATENT AND TRADEMARK OFFICE
CERTIFICATE OF CORRECTION

PATENT NO. : 5,454,872
DATED : October 3, 1995
INVENTOR(S) : Harry J. Lader et al It is certified that error appears in the above-indentified patent and that said Letters Patent is hereby corrected as shown below:

Col. 10, line 44 after "sieve" insert --85,--
Col. 10, line 55 after "by" delete --the--
Col. 11, line 28 after sieve delete "91" and insert --911--
Col. 11, line 32 after "is" insert --pumped--
Col. 11, line 32 after "924" delete --pumped--
Col. 13, line 41 after gun delete ":" and insert --;--
Col. 14, line 56 after device delete ":" and insert --;--

Signed and Sealed this

Nineteenth Day of March, 1996

Attest:

BRUCE LEHMAN

Attesting Officer     Commissioner of Patents and Trademarks